C. H. FINLEY.
LIQUID SUPPLY SYSTEM.
APPLICATION FILED MAR. 7, 1921.
1,391,676.
Patented Sept. 27, 1921.
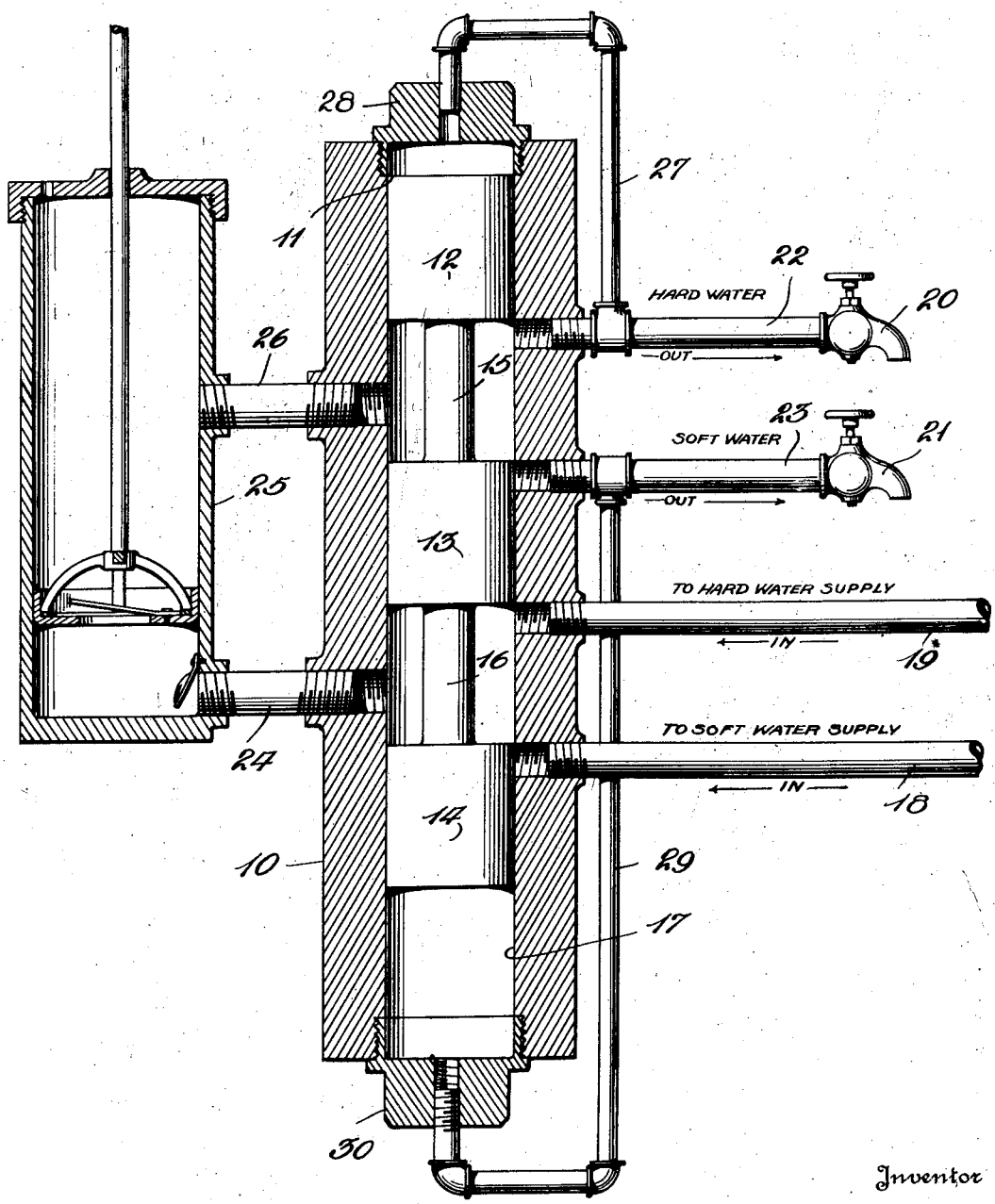
Inventor
C. H. Finley
By
Attorneys

UNITED STATES PATENT OFFICE.

COURT H. FINLEY, OF WILLIAMSBURG, IOWA.

LIQUID-SUPPLY SYSTEM.

1,391,676.           Specification of Letters Patent.     Patented Sept. 27, 1921.

Application filed March 7, 1921. Serial No. 450,319.

*To all whom it may concern:*

Be it known that I, COURT H. FINLEY, a citizen of the United States, residing at Williamsburg, in the county of Iowa and State of Iowa, have invented certain new and useful Improvements in Liquid-Supply Systems, of which the following is a specification.

This invention relates to water supply system, and has as an object the provision of a system wherein a pump may draw water from sources of supply of different kinds of water, as for instance hard and soft, and supply the same to faucets which are individual to each kind and wherein the opening of the faucet corresponding to the kind of water desired will automatically cause the pump to supply that kind of water when operated.

An illustrative embodiment of the invention is shown in the accompanying drawing in which the figure is a vertical central section of a valve casing and a diagrammatic showing of a pump with the supply pipes shown in elevation.

The control element comprises a valve casing 10 containing a balanced valve 11 having three piston portions 12, 13 and 14 connected by reduced portions 15 and 16. Since the piston portions 12, 13 and 14 are of equal diameter any pressure occurring in the cylinder 17 between these elements will have a balanced effect and will not cause longitudinal movement of the valve, as is well understood in the use of balanced valves.

The valve casing is connected to supplies of different kinds of fluid, for instance to a soft water supply by means of a pipe 18, and to a hard water supply by means of a pipe 19, the pipes 18 and 19 being adapted to deliver to the cylinder 17 between the piston portions 13, 14, but one of them being cut off in any operating position of the valve 11.

For discharge of the water the valve casing is connected to a faucet for hard water, as shown at 20, and for soft water at 21, by means of pipes 22, 23, respectively. The connection of pipes 22, 23 with the casing falls between the pistons 12, 13 and one of the openings of these pipes into the cylinder will in any operating position of the piston be closed. The closed opening or pipe 22 or 23 will correspond to the closed opening of the pipes 18 and 19. For instance when the valve is in the position shown in the drawing the inlet for soft water 18 and the outlet for soft water 23 are closed and the hard water pipes are opened. A pipe 24 connecting the intake of the pump 25 with the valve casing 10 opens into the cylinder 17 at a point midway of the extreme positions of the pistons 13, 14, and will therefore not be closed in any position of the valve. A pipe 26 connecting with the discharge of the pump bears a like relation to the pistons 12, 13 where it opens into cylinder 17.

To apply pressure to the valve 11 to shift its position a pipe 27 is connected to pipe 22 and to an opening in a plug 28 in the end of the valve casing 10. A similar pipe 29 is connected to pipe 23 and opens into a plug 30 in the opposite end of the valve casing 10.

The operation of the device is as follows: Assume that hard water is desired, the faucets 20 and 21 being normally closed, the faucet 20 will be opened and the pump started. The space between pistons 13, 14 will act as a continuation of pipe 24 to pipe 19 and the pump will draw water from the hard water supply, deliver the same to pipe 26 through the space between pistons 12, 13, to pipe 22 and faucet 20. Since the open faucet 20 precludes the possibility of any pressure in the cylinder 17 above piston 12, and since any water in the cylinder 17 below piston 14 is confined so that it can not escape, faucet 21 being closed, and moreover since the valve 11 is balanced in its nature, the valve 11 will remain stationary. However, with the valve in the position shown if soft water be desired, the corresponding faucet 21 will be opened and the pump operated. At the first upward stroke of the pump drawing water, which will be hard upon the first stroke, the pressure produced by the pump will act through pipe 27 and produce pressure in the cylinder 17 above piston 12, the faucet 20 being closed. At the same time faucet 21 being open will release from confinement the water in the space below piston 14 in the valve casing, and the unbalanced pressure will cause valve 11 to move downward, closing the opening from the cylinder 17 in the pipe 22 and closing the hard water supply pipe 19, at the same time opening the soft water pipes, whereupon continued operation of the pump will draw soft water through pipe 18 and deliver it through pipe 23 and faucet 21.

It is clear that in any position of the valve 11 the desired sort of fluid will be supplied if the corresponding faucet be opened and the pump operated, the valve 11 remaining stationary or shifting, depending upon the position in which it is found.

It is also clear that the device may be operated with other fluids than water, as for instance with kerosene and gasolene, the material of which the pump is formed being made suitable for the service intended.

It is also clear that the pump may be of any desired form, not necessarily the single acting lift pump shown for purposes of illustration.

Minor changes may be made in the physical embodiment of the invention without departing from its spirit.

I claim:

1. A liquid supply system comprising, in combination, a pump having an intake and a discharge port, independent conduits adapted to be connected to supplies of different kinds of liquids, a separate discharge faucet for each kind of liquid, and means to automatically place the discharge port of the pump into communication with an open faucet and the intake port of the pump into communication with the corresponding supply conduit when the pump is operated with a faucet open.

2. A liquid supply system comprising, in combination, a valve casing, independent means to connect said casing with sources of supply of different kinds of liquid, independent means to connect said casing with a separate faucet for each kind of liquid, a pump, means to connect the intake and the discharge of the pump to said casing, and means in said casing whereby the discharge connection of said pump will be connected with an open faucet and the intake connection of said pump will be connected with the corresponding source of supply of liquid when the pump is operated.

3. A water supply system comprising, in combination, a valve casing, a balanced valve in said casing having connected piston elements providing spaces therebetween, inlet pipes connected to said casing adjacent one of said spaces and to sources of different kinds of fluid supply, discharge pipes connected to said casing adjacent another of said spaces provided with faucets, whereby shifting of said valve will close one of said supply and one of said discharge pipes for like fluids and open the other, a pipe connecting said casing at the supply space with the intake of a pump, and a pipe connecting the discharge of a pump with the discharge space, a connection from each of said discharge pipes and the respective ends of the cylinder beyond the valve whereby opening of the faucet for a given kind of liquid and operation of the pump will result in the supply of the required kind of liquid.

4. A liquid supply control valve comprising, in combination, a valve casing, a balanced piston valve in said casing comprising connected pistons providing intake and discharge spaces therebetween, intake ports for different kinds of liquid opening into said intake space and so spaced that one will be fully closed by one of said pistons when another is fully open, discharge ports opening out of said discharge space and so spaced that one thereof will be fully open when the other is fully closed by said pistons, a port opening into each of said supply and discharge spaces midway of the travel of the pistons relative thereto adapted to be connected to a pump, and means operable by pressure in the casing to automatically shift said valve when the outlet of one of the discharge ports is open and that of the other is closed in an order the reverse of the opening and closing of these ports by the pistons of the valve.

5. A liquid supply control valve comprising, in combination, a valve casing, an inclosed balanced piston valve in said casing comprising connected pistons providing intake and discharge spaces therebetween, intake ports for different kinds of liquid opening into said intake space and so spaced that one will be fully closed by one of said pistons when another is fully open, discharge ports opening out of said discharge space and so spaced that one thereof will be fully open when the other is fully closed by said pistons, a port opening into each of said supply and discharge spaces midway of the travel of the pistons relative thereto adapted to be connected to a pump, means connecting each discharge port with the space at the end of the casing toward which it is placed whereby the valve will be shifted by pressure in the discharge space upon external opening of one and closure of the other discharge port in an order the reverse of the opening and closure of these ports by the pistons of the valve.

In testimony whereof I affix my signature.

COURT H. FINLEY.